United States Patent [19]
Ludwig et al.

[11] 3,957,703
[45] May 18, 1976

[54] PLYWOOD ADHESIVE AND USE THEREOF

[75] Inventors: Charles H. Ludwig, Bellingham, Wash.; Albert W. Stout, deceqsed, late of Bellingham, Wash., by Zelda M. Stout, executor, Bellingham, Wash.

[73] Assignee: Georgia-Pacific Corporation, Portland, Oreg.

[22] Filed: Feb. 25, 1974

[21] Appl. No.: 445,624

[52] U.S. Cl. ............................ 260/17.5; 156/335; 260/25; 260/51 R; 260/52; 260/57 R; 260/124 A; 428/529; 428/524

[51] Int. Cl.² .................................................. C09J 3/28

[58] Field of Search ............... 260/17.5, 17.2, 51, 260/52, 57, 25, 124 A; 428/529; 156/335; 161/262

[56] References Cited
UNITED STATES PATENTS

| | | | |
|---|---|---|---|
| 3,148,177 | 9/1964 | Wiley et al. | 260/17.5 X |
| 3,597,375 | 8/1971 | Ludwig et al. | 260/17.5 |
| 3,658,638 | 4/1972 | Ludwig et al. | 260/17.5 X |

*Primary Examiner*—Murray Tillman
*Assistant Examiner*—T. De Benedictis, Sr.
*Attorney, Agent, or Firm*—Peter P. Chevis

[57] ABSTRACT

A phenolic-aldehyde plywood adhesive containing as an extender a water-insoluble, acid-polymerized lignosulfonate.

10 Claims, No Drawings

PLYWOOD ADHESIVE AND USE THEREOF

This invention pertains to a phenolic-aldehyde adhesive especially useful in plywood manufacture. An adhesive, for example for plywood preparation, must have certain working characteristics in addition to the proper adhesive properties for a satisfactory performance under modern production methods. Even though good strengths may be possible under certain conditions with a particular adhesive, the adhesive may not be suitable for plywood preparation, if the working characteristics are such that these results cannot be readily achieved under the accepted production methods employed in plywood manufacture.

In many processes, the adhesive is applied by spraying. Thus, in addition to the requirements that the adhesive be fast setting, have a good pot life, and have the required penetration to form a strong bond, the consistency of the adhesive has to be such that it can be readily sprayable. Further, in many operations, the assembled panel of plywood or laminated wood products are pre-pressed cold prior to hotpressing. By pre-pressing the assembled panels, the capacity of the heated platen presses is increased and the quality of the laminated wood product or plywood obtained can be materially improved. In cold pre-pressing, the adhesive must form a sufficient bond to permit the handling of the panels without shifting or separating of the plys after the pressure is removed. The laminate or consolidated panel may be stored for various lengths of time from a few minutes to hours after pre-pressing before the panels are subjected to high temperature and pressure to finally cure the adhesive. Thus, the adhesive in addition to providing the necessary initial bond, must remain after pre-pressing in a form capable of forming a strong bond upon heat curing.

To obtain the desired characteristics, the phenolic-aldehyde resin adhesives used in wood lamination such as plywood manufacture, contain many constituents in addition to the resin. While the resin may be the main constituent in the adhesive, extenders, accelerators, fillers, viscosity control agents, and other additives are generally added in amounts such that these constituents may represent from 30 to 50 percent of the adhesive solids. While some of the constituents added such as clays and other fillers are less costly than the resin, the cost of these constituents is still appreciable and contributes considerably to the total cost of the adhesive.

It is, therefore, an object of this inveniton to provide a phenol-aldehyde adhesive for use in wood lamination containing a low-cost extender. A further object is to provide an adhesive which has characteristics enabling it to be used in plywood manufacturing employing spraying and pre-pressing operations. A still further object is to provide a process for the lamination of the wood using the above adhesives and the laminate obtained thereby.

The above and other objects are attained, by this invention, by the use of a phenolic-aldehyde adhesive composition comprising as an extender a water-insoluble, acid-polymerized lignosulfonate. When the lignosulfonate is condensed to the extent that the polymerized lignosulfonate swells or increases in volume not greater than seven times its original bulk volume, the product, in addition to being an extender, also functions as a viscosity control agent eliminating the necessity of adding this agent separately.

Lignosulfonates or sulfonated lignin-containing materials comprise mainly sulfonated products of lignin or lignocellulosic materials. Lignin is a polymeric substance of phenylpropane-type structural units linked in various ways found in plant and vegetable tissue associated with cellulose and other plant constituents. While there is some variation in the chemical structure of lignin and of other constituents found in the plant, depending upon the type of plant, place where it is grown, and also upon the method used in recovery or isolation of the particular constituents from plant tissue, the basic structure and properties of these materials upon sulfonation are similar and form the well-known group of materials referred to as "lignosulfonates".

One of the main sources of lignosulfonates or sulfonated lignins is the residual pulping liquors obtained in the pulp and paper industry where lignocellulosic materials such as wood, straw, corn stalks, bagasse, and the like are digested with a sulfite or bisulfite to separate the cellulose or pulp from the lignin. The lignin is sulfonated and is usually obtained as a by-product in the residual pulping liquor commonly referred to as "spent sulfite liquor". Lignosulfonates or sulfonated lignins may also be obtained by sulfonation of the residual pulping liquors or products containing the lignin portion of the lignocellulosic materials when processes other than the sulfite or bisulfite process are used in the pulping.

Spend sulfite liquor or other sulfonated lignin products obtained by the sulfonation of residual pulping liquors may contain other constituents besides sulfonated lignins. The products may contain carbohydrates, degradation products of carbohydrates, and resinous materials as well as other organic and inorganic constituents. Although these non-lignin constituents may be removed or the lignosulfonate portion may be recovered prior to or after the acid polymerization, it is not necessary to do so.

In polymerizing the lignosulfonate, the liquor or sulfonated lignin product is acidified and maintained under conditions such that the lignosulfonate becomes polymerized to an insoluble resin. The resin as obtained under acid conditions may be ground in a dry state and used as an additive or it may be neutralized and ground in an aqueous slurry. The polymerization may be simply carried out by acidifying, for example spent sulfite liquor, to a pH below 4, preferably below 1, and maintaining the acidified solution at temperatures in the range of 80° to 110°C until the water is evaporated and the product dried. Acid may also be added to solutions of lignosulfonate and the mixture maintained at room temperature or higher until the lignosulfonate has polymerized sufficiently to gel before drying. Dilute or concentrated lignosulfonate solutions or spent sulfite liquor solutions may be used.

The acid-polymerized lignosulfonates obtained are substantially completely polymerized such that very little further changes in the properties of the product are noted upon further heating of the resin under the acid polymerizing conditions. While the product is insoluble in water, acid, and alkali, it will swell upon contact with water. The degree of swelling or increase of volume obtained upon contact with water is some indication of the degree of polymerization obtained. The polymerized lignosulfonate resin used in this invention is polymerized to the extent that upon addition to water the ground resin will swell or increase to a volume less than seven times its original bulk volume under atmospheric room conditions. Resins which swell or increase to a volume about two to four times their original bulk volume are preferred.

In the acidification of the lignosulfonate solutions, generally inorganic acids such as hydrochloric, sulfuric, and phosphoric are used, with sulfuric acid being preferred. However, other acidifying agents may be used, for example, the product may be contacted with a strongly acidic ion-exchange resin and then heated to polymerize the lignosulfonates.

In the preparation of the adhesive using the acid-polymerized lignosulfonate, the polymerized lignosulfonate may be added at any time in amounts commonly used for extenders in phenolformaldehyde adhesives. The polymerized lignosulfonate may be added at the time the plywood adhesive is being prepared or may be added during the preparation of the phenol-formaldehyde resin. The swelling of the acid-polymerized lignosulfonate may increase under alkaline conditions so that the addition of the polymerized lignosulfonate to the plywood adhesive may result in the viscosity of the plywood adhesive increasing somewhat upon standing. This increase in viscosity can be minimized by pretreating the lignosulfonate resin with alkali prior to addition or by the addition of the polymerized lignosulfonate to the end of the cook in preparation of the phenol-formaldehyde resin or shortly thereafter so that the polymerized lignosulfonate would have time to swell under the alkaline conditions by the time the other constituents are added in the plywood adhesive preparation. Usually the resin is added in amounts to replace the starch constituents added such as wheat flour or other extenders such as agricultural residues obtained from furfural manufacture. The amount of these additives used may be up as high as about 50 percent of the total adhesive solids but usually is in the range of 10 to 30 percent of the adhesives solids.

While phenol-formaldehyde resin is most often used in the preparation of adhesives for wood lamination, other resins from different phenols, such as xylenols, cresols, and others, and aldehydes such as acetaldehyde, furfural, and the like are at times used. The acid polymerized lignosulfonate may be used as an extender in the adhesives using the other phenol-aldehyde resins.

To further illustrate the invention, acid polymerized lignosulfonate was used as a simple replacement for some constituents in a phenol-formaldehyde plywood adhesive and panels prepared from the adhesive were compared to the panels using the standard adhesive.

A phenol-formaldehyde resin was prepared by condensing phenol and formaldehyde in a mole ratio of 2.2 moles of formaldehyde per mole of phenol. The condensation was carried out under alkaline conditions with periodic additions to the mixture of caustic totaling about 8.2 weight percent of the phenol-formaldehyde resin. The resin was condensed to a point such that a 40 weight percent solution of the resin had a viscosity of 500 centipoises at 25°C. The plywood adhesive was prepared by intermixing in 410 grams of water 200 grams of acid polymerized lignosulfonate. To this mixture, 50 grams of wheat flour were added. The phenolformaldehyde resin, as a 40 percent aqueous solution was added in two stages. After intermixing the wheat flour, 110 grams of the resin were added after which 26 grams of sodium hydroxide, as a 50 percent sodium hydroxide solution and 20 grams of sodium carbonate were intermixed. The remainder of the phenolic resin, in the amount of 1050 grams as the 40 weight percent solid solution, was then added and intermixed.

The polymerized lignosulfonate was prepared from a calcium base fermented spent sulfite liquor. To a solution of spent sulfite liquor containing about 50 weight percent of solids, 14 percent of sulfuric acid, based upon the spent sulfite liquor solids was added. The pH of the acidified solution was below 1. A portion of the acidified liquor was centrifuged to remove the calcium sulfate obtained upon the addition of the acid. Both portions of the acidified liquors were tray dried by placing the solutions in a tray at a temperature at 100°C to evaporate the water and polymerize the lignosulfonate. The dried products obtained were slurried with water, neutralized with caustic, and ball milled to grind the product after which it was spray dried. The dried powders obtained were passed through a 100 mesh screen and upon exposure to water increased in volume to about twice their volumes at room conditions.

The above acid-polymerized lignosulfonate products, one containing the calcium sulfate and the other substantially free of the calcium sulfate, were used in the preparation of the adhesive product.

In testing the adhesives, six 1 × 1 foot five-ply panels were prepared with each adhesive using the adhesive in an amount of 65 pounds of adhesive per 1000 square feet of double glue line. The plys were left at open assembly for 25 minutes and then assembled and pressed at 300°F at 200 pounds per square inch for 4 ¾ minutes. After standing for 24 hours, test specimens were cut from the panels and tested according to the American Plywood Association Vacuum-Pressure Test procedure. The specimens were submerged completely in water at room temperature under a vacuum of 25 inches of mercury for 30 minutes and then subjected to a pressure of 65 pounds per square inch for 30 minutes. The results obtaind for the two adhesive preparations showed average wood failures of 94% and 93%. Under the American Plywood Association requirements, a wood failure as low as 85% is acceptable.

What is claimed is:

1. In a phenol-aldehyde plywood adhesive, the improvement of using as an extender, a water-insoluble, acid polymerized lignosulfonate.

2. A composition according to claim 1 wherein the water-insoluble, acid polymerized lignosulfonate is polymerized from a spent sulfite liquor to the extent such that the dry polymerized lignosulfonate will increase less than seven times its dry bulk volume upon exposure to water.

3. An adhesive according to claim 2 wherein the phenolaldehyde resin in the adhesive is a resin of phenol and formaldehyde.

4. An adhesive according to claim 2 wherein the lignosulfonate is polymerized such that the dry polymerized lignosulfonate will increase in volume from about two to four times its dry bulk volume upon exposure to water.

5. An adhesive according to claim 4 wherein the phenolaldehyde resin in the adhesive is a resin of phenol and formaldehyde.

6. In a process for the manufacture of plywood wherein a phenol-aldehyde plywood adhesive is used, the improvement of using as an extender in the phenol-aldehyde adhesive, a water-insoluble, acid polymerized lignosulfonate, said lignosulfonate being polymerized to the extent that the lignosulfonate will increase in volume less than seven times its dry bulk volume upon exposure to water.

7. A process according to claim 6 wherein the phenol-aldehyde plywood adhesive is a phenol-formaldehyde adhesive and said polymerized lignosulfonate is polymerized to the extent that the polymerized lignosulfonate will increase in volume from about two to four times its dry bulk volume upon exposure to water.

8. A wood laminate consisting essentially of wood plys bonded together by a phenol-aldehyde adhesive of claim 1.

9. A wood laminate consisting essentially of wood plys bonded together by a phenol-aldehyde adhesive of claim 2.

10. A wood laminate consisting essentially of wood plys bonded together by a phenol-aldehyde adhesive of claim 5.

* * * * *